US012531020B2

(12) United States Patent
Kim et al.

(10) Patent No.: US 12,531,020 B2
(45) Date of Patent: Jan. 20, 2026

(54) DISPLAY DEVICE

(71) Applicant: Samsung Display Co., LTD., Yongin-si (KR)

(72) Inventors: Jung Taek Kim, Yongin-si (KR); Byeong Doo Kang, Yongin-si (KR); Joon Suk Baik, Yongin-si (KR); Se Keun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 655 days.

(21) Appl. No.: 17/857,151

(22) Filed: Jul. 4, 2022

(65) Prior Publication Data

US 2023/0129090 A1 Apr. 27, 2023

(30) Foreign Application Priority Data

Oct. 21, 2021 (KR) ........................ 10-2021-0141358

(51) Int. Cl.

*G09G 3/3233* (2016.01)
*G09G 3/3275* (2016.01)
*G09G 3/3266* (2016.01)

(52) U.S. Cl.

CPC ......... *G09G 3/3233* (2013.01); *G09G 3/3275* (2013.01); *G09G 3/3266* (2013.01); *G09G 2300/0819* (2013.01); *G09G 2300/0842* (2013.01); *G09G 2310/08* (2013.01); *G09G 2320/0233* (2013.01)

(58) Field of Classification Search

CPC .. G09G 3/3233; G09G 3/3275; G09G 3/3266; G09G 2300/0819; G09G 2300/0842; G09G 2310/08; G09G 2320/0233; G09G 2320/0285; G09G 2320/0295; G09G 2320/043; G09G 5/003; G09G 3/3258

See application file for complete search history.

(56) References Cited

U.S. PATENT DOCUMENTS

| | | | | |
|---|---|---|---|---|
| 9,495,909 B2 | 11/2016 | Tani et al. | | |
| 9,558,717 B2 | 1/2017 | Takasugi et al. | | |
| 10,593,268 B2 | 3/2020 | An et al. | | |
| 10,777,140 B2 | 9/2020 | Kim et al. | | |
| 11,107,404 B2 | 8/2021 | Park | | |
| 2015/0170578 A1* | 6/2015 | Choi | G09G 3/3266 345/212 | |
| 2015/0187268 A1* | 7/2015 | Tani | G09G 3/3233 345/77 | |
| 2017/0345375 A1* | 11/2017 | Cho | G09G 3/3275 | |
| 2019/0253662 A1* | 8/2019 | Kim | H04N 7/0127 | |

(Continued)

FOREIGN PATENT DOCUMENTS

| | | |
|---|---|---|
| KR | 10-2168014 | 10/2016 |
| KR | 20180055575 A | 5/2018 |

(Continued)

*Primary Examiner* — Jeff Piziali

(74) *Attorney, Agent, or Firm* — CANTOR COLBURN LLP

(57) ABSTRACT

A display device includes a pixel unit that includes a plurality of pixels, a compensator configured to receive sensing data from the pixel unit in a sensing period and that detects and compensates for a characteristic of the pixels, and a timing controller configured to convert an image signal received from an outside into image data.

9 Claims, 15 Drawing Sheets

(56) References Cited

U.S. PATENT DOCUMENTS

| | | | | |
|---|---|---|---|---|
| 2019/0378459 | A1* | 12/2019 | Kim | G09G 3/3291 |
| 2020/0193915 | A1* | 6/2020 | Noh | G09G 3/3233 |
| 2021/0118378 | A1* | 4/2021 | Son | G09G 3/006 |
| 2022/0036812 | A1* | 2/2022 | Noh | G09G 3/32 |
| 2022/0068194 | A1 | 3/2022 | Kim et al. | |
| 2022/0122545 | A1* | 4/2022 | Hong | H10K 59/12 |
| 2023/0095441 | A1* | 3/2023 | Kwun | G09G 3/006<br>345/204 |
| 2023/0298524 | A1* | 9/2023 | Cho | G09G 3/3233<br>345/691 |
| 2023/0306890 | A1* | 9/2023 | Cho | G09G 3/2092 |

FOREIGN PATENT DOCUMENTS

| | | | |
|---|---|---|---|
| KR | 20190140760 | A | 12/2019 |
| KR | 10-2081132 | | 2/2020 |
| KR | 10-2020-0050585 | | 5/2020 |
| KR | 10-2020-0057295 | | 5/2020 |
| KR | 10-2020-0080783 | | 7/2020 |
| KR | 10-2022-0030495 | | 3/2022 |

* cited by examiner

DISPLAY DEVICE

CROSS-REFERENCE TO RELATED APPLICATION

This application claims priority from and the benefit of Korean Patent Application No. 10-2021-0141358, filed on Oct. 21, 2021, which is hereby incorporated by reference for all purposes as if fully set forth herein.

BACKGROUND

Field

Embodiments of the invention relate generally to a display device, and more particularly, to a display device varying a driving frequency (or a frame rate).

Discussion of the Background

A display device includes a pixel unit including a plurality of pixels and a driver for driving the pixel unit. The driver displays an image in the pixel unit using an image signal applied from an external graphic processor. The graphic processor generates the image signal by rendering original data, and a rendering time for generating an image signal corresponding to one frame may vary according to a type or a characteristic of an image. The driver may vary a frame rate in response to the rendering time.

The pixel may include a pixel circuit including a plurality of transistors and capacitors and a light emitting element. When a scan signal is supplied from a scan line, the pixel circuit may receive a data voltage from a data line and supply a current of a driving transistor according to the data voltage to the light emitting element. The light emitting element may emit light with intensity corresponding to the current of the driving transistor.

A problem in that a deviation occurs in an electrical characteristic (or a threshold voltage and mobility) of driving transistor between the pixels due to a process deviation, deterioration, or the like, and thus a desired grayscale may not be implemented, resulting in a sub-optimal display of an image. In order to solve this problem, an external compensation method of compensating the electrical characteristic deviation of the driving transistor outside the pixel during a vertical blank period between active periods is used.

The above information disclosed in this Background section is only for understanding of the background of the inventive concepts, and, therefore, it may contain information that does not constitute prior art.

SUMMARY

An inventive concept consistent with one or more embodiments is to provide a display device that improves a visual recognition phenomenon of a sensing horizontal line that may be generated by real-time sensing using an external compensation circuit.

Additional features of the inventive concepts will be set forth in the description that follows, and in part will be apparent from the description, or may be learned by practice of the inventive concepts.

In order to solve the above-described object, a display device according to an embodiment includes a pixel unit that includes a plurality of pixels, a compensator configured to receive sensing data from the pixel unit in a sensing period and that detects and compensates for a characteristic of the pixels, and a timing controller configured to convert an image signal received external to the display device into image data.

A frame includes an active period in which the image data is supplied and a blank period of which a length is changed according to a frame frequency change, and the timing controller outputs compensation image data for compensating for a luminance decrease due to the sensing period in a normal data write period before the sensing period in the active period, outputs the compensation image data in a first data re-write period after the sensing period in the blank period, and outputs the image data in a second data re-write period after the first data re-write period in the blank period.

A start time point of the second data re-write period may coincide with a time when a length of a blank period corresponding to a maximum frame frequency elapses from a start time point of the sensing period.

When external compensation is required, the timing controller may change the image data to external compensation image data based on the sensed data, and output the external compensation image data instead of the image data in the normal data write period and the second data re-write period.

The display device may further include a data driver configured to convert the image data, the external compensation image data, and the compensation image data received from the timing controller into a data voltage, an external compensation data voltage, and a compensation data voltage, respectively, and supply the data voltage, the external compensation data voltage, and the compensation data voltage to the pixel unit.

A total luminance amount increased by the compensation data voltage may be substantially the same as a luminance amount decreased during the first data re-write period and the second data re-write period.

The timing controller may vary a size of the compensation image data output in the first data re-write period in response to a position of the pixels.

The timing controller may increase the size of the compensation image data as the position of the pixels is closer to a lower end of the pixel unit.

A luminance amount increased by the compensation data voltage output in the first data re-write period may be substantially the same as a luminance amount decreased during the first data re-write period and the second data re-write period.

The timing controller may determine a size of the compensation image data based on a grayscale and/or a color of the image data or the external compensation image data.

According to an embodiment, a display device includes a pixel unit including a plurality of pixels, a compensator configured to receive sensing data from the pixel unit in a sensing period for detecting and compensating for a characteristic of the pixels, and a timing controller configured to convert an image signal received from an outside into image data.

A frame includes an active period in which the image data is supplied and a blank period of which a length varies according to a frame frequency change.

The timing controller includes a data aligner configured to convert the image signal into the image data, an external compensation value calculator configured to convert the image data into external compensation image data based on the sensing data, a sensing control line determiner configured to select at least one pixel row for performing sensing in the blank period based on a data enable signal received from the outside, a compensation value determiner configured to determine a compensation value according to a grayscale and/or a color of the image data or the external compensation image data, an adder configured to calculate compensation image data by adding the image data or the external compensation image data and the compensation value, a blank period detector configured to detect the blank period based on the data enable signal, and a selector configured to selectively output the external compensation image data and the compensation image data based on a time point of the blank period.

The display device may further include a first storage configured to receive and store the compensation image data from the adder, and a second storage configured to receive and store the image data or the external compensation image data from the external compensation value calculator.

The selector may output the compensation image data received from the adder in a normal data write period before the sensing period in the active period, output the compensation image data received from the first storage in a first data re-write period after the sensing period in the blank period, and output the image data received from the second storage in a second data re-write period after the first data re-write period in the blank period.

The display device may further include a compensation ratio determiner configured to receive position information of the pixel row on which sensing is performed from the sensing control line determiner and calculate a compensation ratio corresponding to a position of the pixel row.

The display device may further include a multiplier configured to multiply the compensation value received from the compensation value determiner by the compensation ratio to calculate a final compensation value.

The adder may calculate the compensation image data by adding the image data or the external compensation image data and the final compensation value.

The blank period detector may receive a horizontal synchronization signal from the outside, and the display device may further include a line counter configured to calculate the frame frequency by counting the horizontal synchronization signal received from the blank period detector.

According to an embodiment, a display device includes a pixel unit including a plurality of pixels, a compensator configured to receive sensing data from the pixel unit in a sensing period for detecting and compensating for a characteristic of the pixels, and a timing controller configured to convert an image signal received from an outside into image data.

A frame includes an active period in which the image data is supplied and a blank period of which a length varies according to a frame frequency change.

The timing controller outputs compensation image data for compensating for a luminance decrease due to the sensing period in a normal data write period before the sensing period in the active period, outputs the compensation image data in a first data re-write period after the sensing period in the blank period, and provides an initialization voltage to the pixel in a preset period during an excess compensation period generated in the blank period when a frequency of a current frame becomes less than a frame frequency of a previous frame.

The excess compensation period may increase in response to an increased length of the blank period of the current frame compared to a length of the blank period of the previous frame.

According to an embodiment, a display device includes a pixel unit including a plurality of pixels, a compensator configured to receive sensing data from the pixel unit in a sensing period for detecting and compensating for a characteristic of the pixels, and a timing controller configured to convert an image signal received from an outside into image data.

A frame includes an active period in which the image data is supplied and a blank period of which a length varies according to a frame frequency change.

The timing controller outputs compensation image data for compensating for a luminance decrease due to the sensing period in a data re-write period after the sensing period in the blank period of a previous frame, and outputs accumulated compensation image data for compensating for over-compensation or under-compensation of the compensation image data due to the frame frequency change in a normal data write period in the active period of a current frame.

The compensation image data may be calculated by adding the image data to a compensation value determined according to a grayscale and/or a color of the image data.

The accumulated compensation image data may be calculated by adding the image data to an accumulated compensation value calculated by multiplying a variation amount of a frame time calculated by comparing a reference frame frequency with a frame frequency of the previous frame by the compensation value.

The display device according to an embodiment may improve a visual recognition phenomenon of a sensing horizontal line that may be generated by real-time sensing using an external compensation circuit, by removing over-compensation or under-compensation of a luminance in a blank period of which a length varies due to a frame frequency change.

An effect according to the embodiments to be described hereinbelow is not limited by the contents exemplified above, and more various effects are included in the specification.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
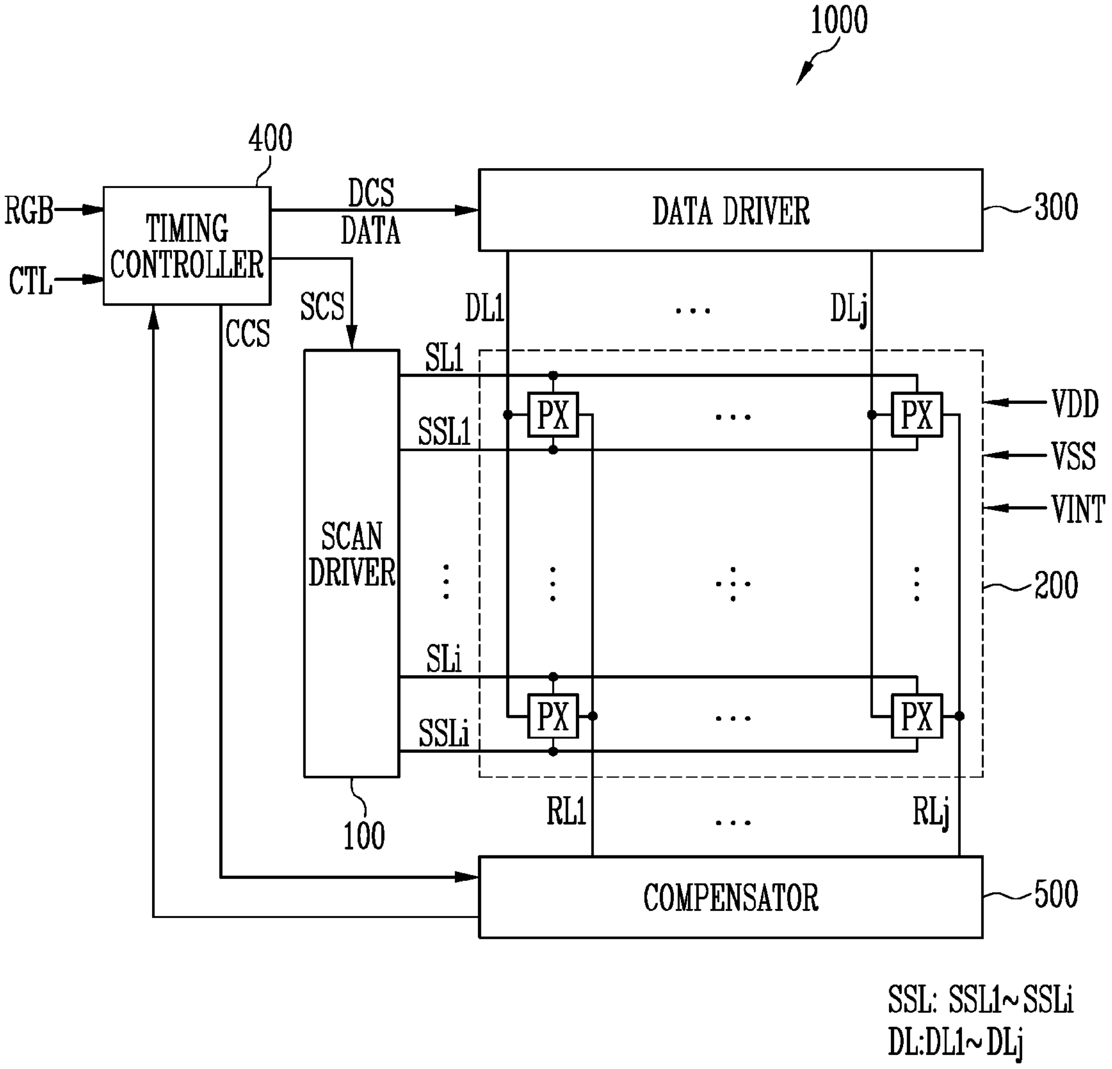
FIG. 1 is a block diagram illustrating a display device according to an embodiment that is constructed according to principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments are described in more detail with reference to the accompanying drawings.

FIG. 1 is a block diagram illustrating a display device according to an embodiment that is constructed according to principles of the invention.

Referring to FIG. 1, the display device 1000 may include a scan driver 100, a pixel unit 200, a data driver 300, a timing controller 400, and a compensator 500.

The display device 1000 may be a flat display device, a flexible display device, a curved display device, a foldable display device, or a bendable display device. In addition, the display device may be applied to a transparent display device, a head-mounted display device, a wearable display device, or the like.

The display device 1000 may be implemented as a self-emission display device including a plurality of self-emission elements. For example, the display device 1000 may be an organic light emitting display device including organic light emitting elements, a display device including inorganic light emitting elements, or a display device including light emitting elements configured of an inorganic material and an organic material in combination. However, this is an example, and the display device 1000 may be implemented as a liquid crystal display device, a plasma display device, a quantum dot display device, or the like.

In an embodiment, the display device 1000 may be divided into an active period for displaying an image and a blank period of which a length varies according to a change of a frame rate (a frame frequency) and may be driven. The length of the blank period may be adjusted to improve a discrepancy between frame information supplied from an external host system (for example, a graphic processor, an application processor, or the like) and a timing at which the display device 1000 outputs an image frame.

The timing controller 400 may generate a data driving control signal DCS, a scan driving control signal SCS, and a compensation driving control signal CCS in response to a control signal CTL supplied from an outside (i.e., external to the display device 1000).

The control signal CTL may include a vertical synchronization signal, a horizontal synchronization signal, a data enable signal, and the like.

The vertical synchronization signal may include a plurality of pulses, and may indicate that a previous frame period is ended and a current frame period is started based on a time point at which each of the pulses is generated. In the vertical synchronization, an interval between adjacent pulses may correspond to one frame period. The horizontal synchronization signal may include a plurality of pulses, and may indicate that a previous horizontal period is ended and a new horizontal period is started based on a time point at which each of the pulses is generated. The data enable signal may indicate that an image signal RGB is supplied in a horizontal period.

The data driving control signal DCS generated by the timing controller 400 may be supplied to the data driver 300, the scan driving control signal SCS may be supplied to the scan driver 100, and the compensation driving control signal CCS may be supplied to the compensator 500.

In addition, the timing controller 400 may supply image data DATA in which an externally supplied image signal RGB is rearranged to the data driver 300.

The data driving control signal DCS may include a source start signal and clock signals. The source start signal controls a sampling start time point of data. The clock signals may be used to control a sampling operation.

The scan driving control signal SCS may include a scan start signal and clock signals. The scan start signal controls a first timing of a scan signal. The clock signals may be used to shift the scan start signal.

The compensation driving control signal CCS may control driving of the compensator 500 for sensing and deterioration compensation of a pixel PX.

In an embodiment, the timing controller 400 may divide one frame into the active period and the blank period based on the control signal CTL. The timing controller 400 may count the length of the blank period and generate a count signal.

The scan driver 100 may receive the scan driving control signal SCS from the timing controller 400. The scan driver 100 receiving the scan driving control signal SCS may supply the scan signal to scan lines SL1 to SLi (where i is a natural number). According to an embodiment, the scan driver 100 may sequentially supply the scan signal to the scan lines SL1 to SLi. When the scan signal is sequentially supplied to the scan lines SL1 to SLi, the pixels PX may be selected in a horizontal line (or pixel row) unit. To this end, the scan signal may be set to a gate-on voltage (for example, a logic high level) so that a transistor included in the pixels PX is turned on.

In addition, the scan driver 100 receiving the scan driving control signal SCS may supply a sensing control signal to sensing control lines SSL1 to SSLi.

According to an embodiment, a timing at which the scan signal and the sensing control signal are supplied and a waveform of the scan signal and the sensing control signal may be set differently according to the active period, a sensing period, the blank period, and the like.

The data driver 300 may receive the data driving control signal DCS from the timing controller 400. The data driver 300 receiving the data driving control signal DCS may supply a data signal (or a data voltage) for image display to data lines DL1 to DLj (where j is a natural number) in a display period. The data signal may be a data voltage for displaying an effective image, that is, a voltage corresponding to the image data DATA. The data signal supplied to the data lines DL1 to DLj may be supplied to the pixels PX selected by the scan signal. To this end, the data driver 300 may supply the data signal to the data lines DL1 to DLj to be synchronized with the scan signal.

In addition, the data driver 300 receiving the data driving control signal DCS may supply the data voltage for electrical characteristic detection of the pixel PX to the data lines DL1 to DLj in the sensing period.

The pixel unit 200 may include the pixels PX connected to the scan lines SL1 to SLi, the sensing control lines SSL1 to SSLi, the data lines DL1 to DLj, and sensing lines RL1 to RLj. The pixel unit 200 may receive a first driving voltage VDD, a second driving voltage VSS, and an initialization voltage VINT from the outside.

The compensator 500 may receive sensing data from the sensing lines RL1 to RLj by performing sensing for external compensation for each pixel row.

During the display period, the compensator 500 may supply a predetermined initialization voltage VINT (refer to FIG. 3) for image display to the pixel unit 200 through the sensing lines RL1 to RLj.

In an embodiment, transistors included in the display device 1000 may be N-type type oxide thin film transistors. For example, the oxide thin film transistor may be a low temperature polycrystalline oxide (LTPO) thin film transistor. However, this is an example, and the N-type transistors are not limited thereto. For example, an active pattern (semiconductor layer) included in the transistors may include an inorganic semiconductor (for example, amorphous silicon or polysilicon), an organic semiconductor, or the like.

However, this is an example, and at least one of the transistors included in the display device 1000 may be replaced with a P-type transistor. For example, the P-type transistor may be a P-channel metal oxide semiconductor (PMOS) transistor.

Figure 2:
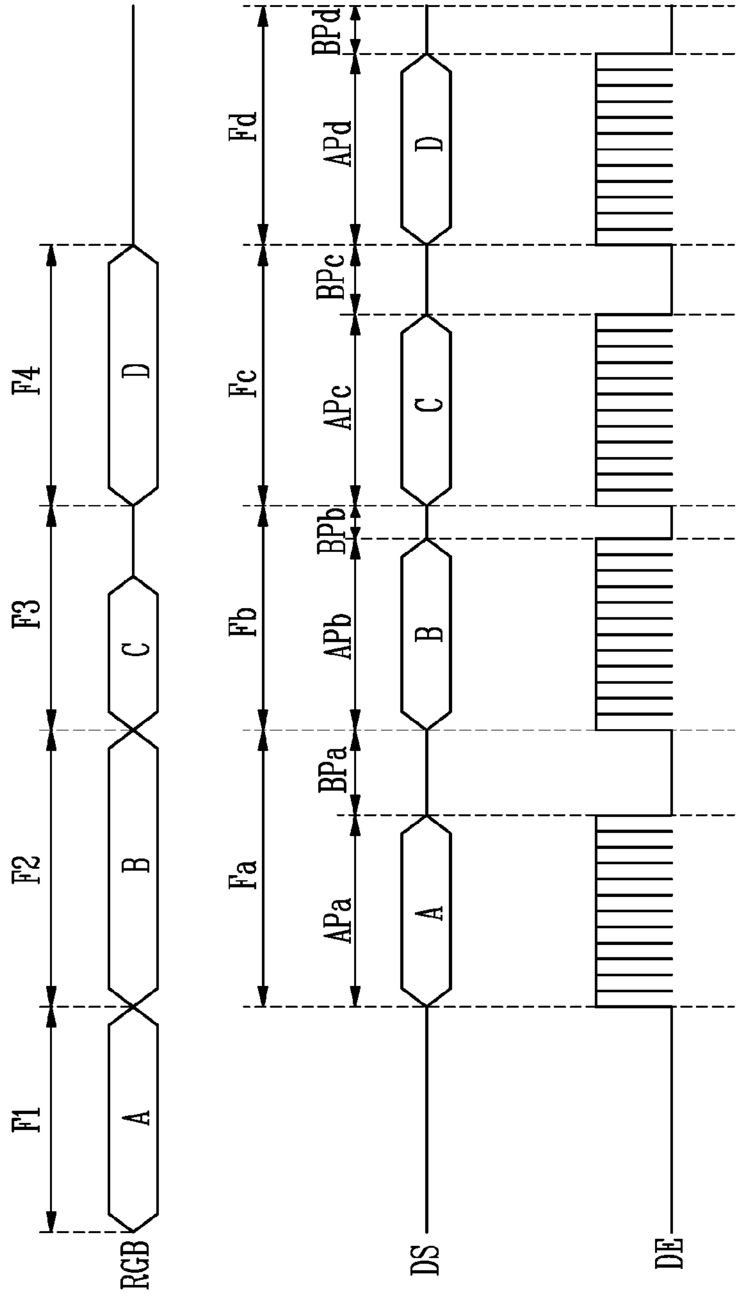
FIG. 2 is a diagram illustrating an example of display device driving according to an image signal supplied from an outside.

FIG. 2 is a diagram illustrating an example of display device driving according to an image signal supplied from the outside.

Referring to FIGS. 1 and 2, the image signal RGB supplied from the outside may be a signal rendered by a graphic processor or the like. A frame rate of the image signal RGB may be changed according to a rendering time of the graphic processor.

In the following description, the frame rate denotes a frame frequency, that is, the number of frames transmitted per second (frame per second). As the frame rate increase, a time length and the blank period of one frame may decrease, and as the frame rate decreases, the time length and the blank period of one frame may increase.

In an embodiment, when the frame rate of the image signal RGB varies according to the rendering time of the graphic processor, the frame rate of the display device 1000 may also be changed.

The image signal RGB may be output as a data signal DS (or a data voltage) after being signal-processed by the timing controller 400 and delayed by one frame. In an embodiment, the data signal DS may be output based on the data enable signal DE supplied from the timing controller 400.

The frame rate of the display device 1000 may be the same as a frame rate of a frame delayed by one frame of the image signal RGB received from the outside. For example, a frame rate of a frame Fa at which an “A” data signal DS of the display device 1000 is output may be the same as a frame rate of a frame F2 at which a “B” image signal RGB is received. A frame rate of a frame Fb at which a “B” data signal DS of the display device 1000 is output may be the same as a frame rate of a frame F3 at which a “C” image signal RGB is received.

One frame of the display device 1000 may include the active period in which the data signal DS is output and the blank period. Time lengths of active periods APa, APb, APc, and APd in which data signals DS “A”, “B”, “C”, and “D” are output in each of the frames Fa, Fb, Fc, and Fd may be equal to each other. In an embodiment, each of the active periods APa, APb, APc, and APd may include a scan period in which the data signal DS is written in the pixel.

Time lengths of the blank periods BPa, BPb, BPc, and BPd may vary according to a difference of the frame rate of each of the frames Fa, Fb, Fc, and Fd and the active periods APa, APb, APc, and APd.

As shown in FIG. 2, since the frame rate of the frame Fa at which the “A” data signal DS is output is less than the frame rate of the frame Fb at which the “B” data signal DS is output, the time length of the blank period BPa may be longer than the time length of the blank period BPb.

As described above, even though the frame rate is irregularly changed, the lengths of the blank periods BPa, BPb, BPc, and BPd of each of the frames Fa, Fb, Fc, and Fd may be controlled, thereby improving image tearing due to a discrepancy between frame generation of the graphic processor and frame output of the display device, and input lag in which a portion of an input frame disappears.

In the display device 1000 (refer to FIG. 1), sensing for external compensation is generally performed in one pixel row unit. An image may not be output during the sensing period in a pixel row on which the sensing for the external compensation is performed. Therefore, the pixel row on which the sensing for the external compensation is performed may have a lower luminance compared to pixel rows on which the sensing is not performed, and thus the pixel row on which the sensing is performed may be visually recognized by a user.

When input image data corresponding to the pixel row on which the sensing for the external compensation is received in order to prevent the pixel row on which the sensing is performed from being visually recognized by the user, the input image data may be converted into compensation image data using a compensation value, and a compensation data voltage corresponding to the compensation image data may be supplied to the data line before and after the sensing is performed. For example, a luminance corresponding to the compensation image data may be greater than a luminance corresponding to the input image data.

In a driving method of FIG. 2 (for example, free-sync driving or G-sync driving), since the blank period also changes according to the frame rate change, a problem that compensation according to the compensation image data may be excessively performed or insufficiently performed may occur. Therefore, in the driving of FIG. 2, a method for decreasing a visual recognition phenomenon according to the external compensation is requested.

Figure 3:
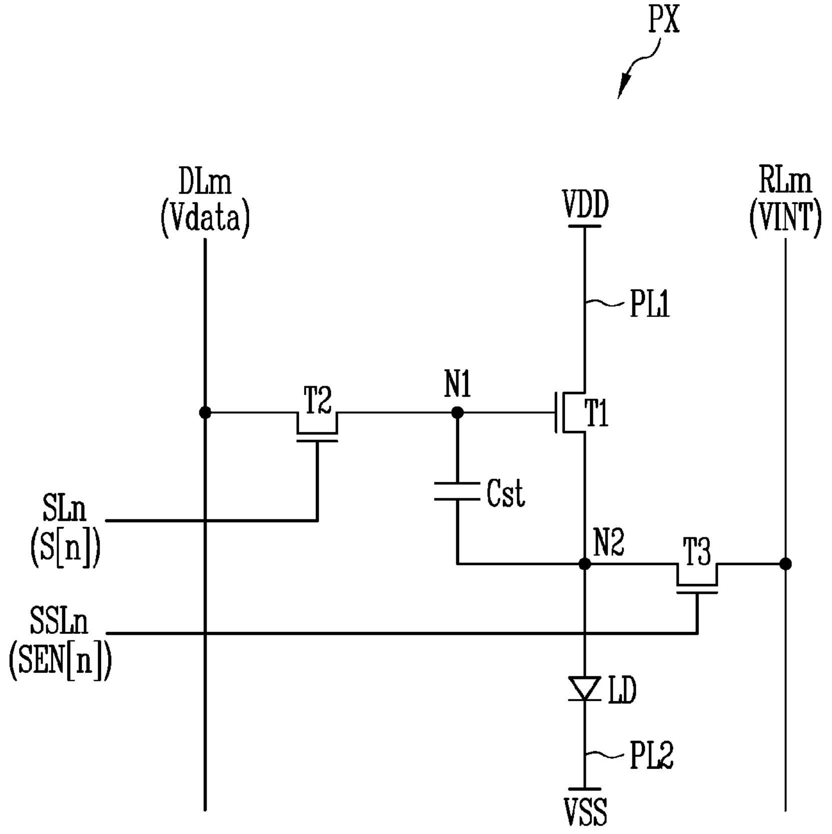
FIG. 3 is a circuit diagram illustrating an example of a pixel included in the display device of FIG. 1.

FIG. 3 is a circuit diagram illustrating an example of the pixel included in the display device of FIG. 1. FIG. 3 exemplarily shows a pixel PX included in an n-th pixel row and an m-th pixel column (where n and m are positive integers).

Referring to FIG. 3, the pixel PX may include a light emitting element LD, a first transistor T1 (or a driving transistor), a second transistor T2 (or a switching transistor), a third transistor T3 (or a sensing transistor), and a storage capacitor Cst.

The light emitting element LD may generate light of a predetermined luminance in response to a current amount supplied from the first transistor T1. The light emitting element LD includes a first electrode and a second electrode, the first electrode is connected to a second node N2, and the second electrode is connected to a second power line PL2 to which the second driving voltage VSS is applied. In an embodiment, the first electrode may be an anode and the second electrode may be a cathode. According to an embodiment, the first electrode may be a cathode, and the second electrode may be an anode.

In an embodiment, the light emitting element LD may be an inorganic light emitting element formed of an inorganic material. According to an embodiment, the light emitting element LD may be an organic light emitting diode including an organic light emitting layer. In addition, the light emitting element LD may be a light emitting element configured of an inorganic material and an organic material in combination.

A first electrode of the first transistor T1 may be connected to a first power line PL1 to which the first driving voltage VDD is applied, and a second electrode of the first transistor T1 may be connected to the first electrode of the light emitting element LD (or the second node N2). A gate electrode of the first transistor T1 may be connected to a first node N1. In an embodiment, the first electrode may be a drain electrode, and the second electrode may be a source electrode.

The first transistor T1 may control a current amount flowing into the light emitting element LD in response to a voltage of the first node N1. At this time, the first transistor T1 may be turned on when a voltage between the first node N1 and the second node N2 (that is, a gate-source voltage) is greater than a threshold voltage.

A first electrode of the second transistor T2 may be connected to an m-th data line DLm, and a second electrode of the second transistor T2 may be connected to the first node N1 (or the gate electrode of the first transistor T1). Agate electrode of the second transistor T2 may be connected to an n-th scan line SLn. The second transistor T2 may be turned on when a scan signal S[n] (for example, a high level voltage) is supplied to the n-th scan line SLn to transmit a data voltage Vdata from the m-th data line DLm to the first node N1.

A first electrode of the third transistor T3 may be connected to an m-th sensing line RLm, and a second electrode may be connected to the second node N2 (or the second electrode of the first transistor T1). A gate electrode of the third transistor T3 may be connected to an n-th sensing control line SSLn. The third transistor T3 may be turned on when a sensing control signal SEN[n] (for example, a high level voltage) is supplied to the n-th sensing control line SSLn to electrically connect the m-th sensing line RLm and the second node N2. Accordingly, the initialization voltage VINT may be provided to the second node N2 during a predetermined time. However, the embodiment described herein is not limited thereto, and a sensing current (or a sensing voltage) corresponding to a node voltage of the second node N2 may be transmitted to the m-th sensing line RLm. The sensing voltage may be provided to the compensator 500 (refer to FIG. 1) through the m-th sensing line RLm.

The storage capacitor Cst is connected between the first node N1 and the second node N2. The storage capacitor Cst may charge the data voltage Vdata corresponding to the data signal supplied to the first node N1 during one frame. Accordingly, the storage capacitor Cst may store a voltage corresponding to a voltage difference between the first node N1 and the second node N2. Here, when the data voltage Vdata is supplied, the initialization voltage VINT may be supplied to the second node N2, and thus the storage capacitor Cst may store a difference voltage of the data voltage Vdata and the initialization voltage VINT. Whether the first transistor T1 is turned on or off may be determined according to the voltage stored in the storage capacitor Cst.

A circuit structure of the pixel PX is not limited to FIG. 3. For example, the light emitting element LD may be positioned between the first power line PL1 connected to the first driving voltage VDD and the first electrode of the first transistor T1.

Although FIG. 3 shows the transistor as an NMOS, the embodiment described herein is not limited thereto. For example, at least one of the first to third transistors T1, T2, and T3 may be implemented as a PMOS. In addition, the first to third transistors T1, T2, and T3 shown in FIG. 3 may be thin film transistors including at least one of an oxide semiconductor, an amorphous silicon semiconductor, and a polycrystalline silicon semiconductor.

Figure 4:
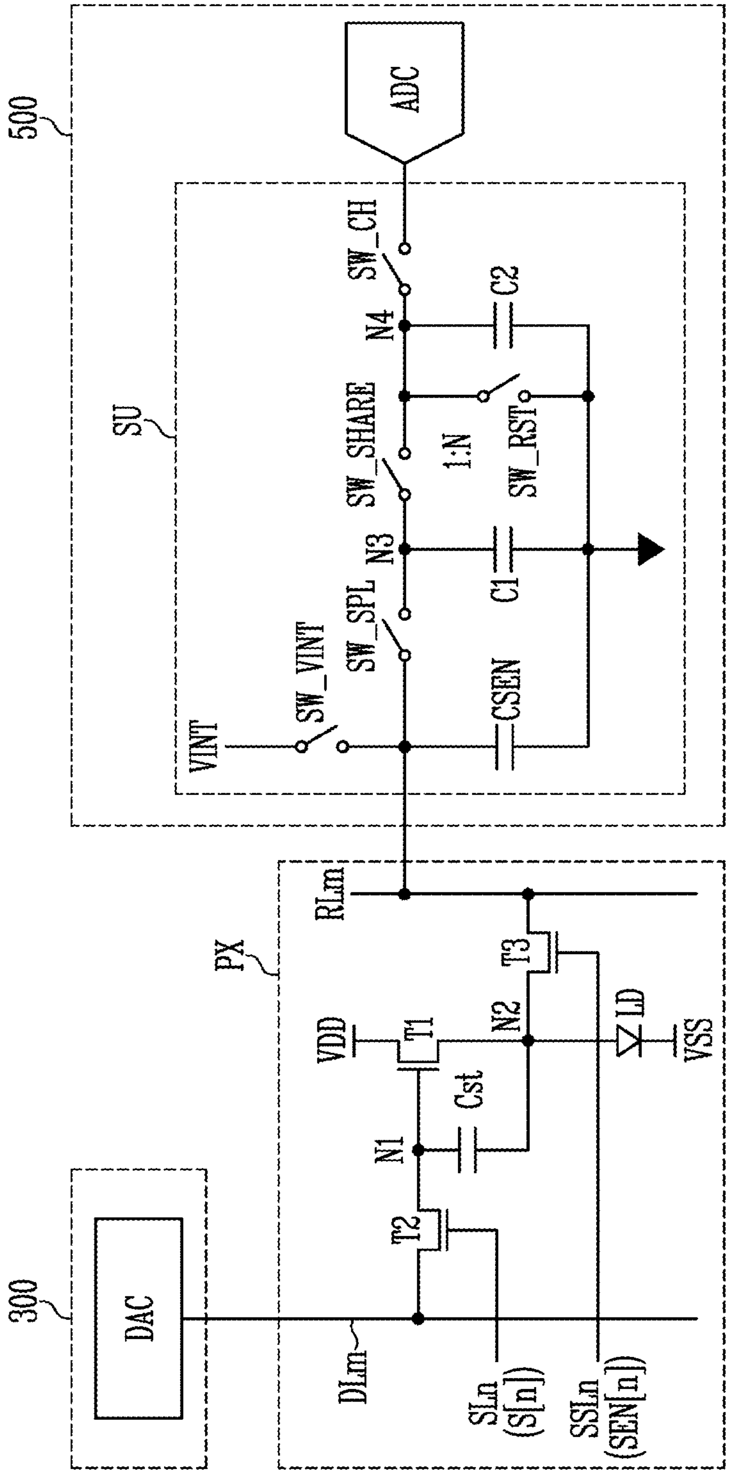
FIG. 4 is a circuit diagram illustrating an example of a compensator included in the display device of FIG. 1.

FIG. 4 is a circuit diagram illustrating an example of the compensator included in the display device of FIG. 1. FIG. 4 briefly shows the data driver 300 based on a portion of the compensator 500 connected to the pixel PX through the m-th sensing line RLm to sense a characteristic of the pixel PX. Since the pixel PX shown in FIG. 4 is the same as the pixel PX described with reference to FIG. 3, a repetitive description of the pixel PX is omitted for ease in explanation of FIG. 4.

The data driver 300 may include a digital-to-analog converter (DAC). The digital-to-analog converter DAC may generate the data voltage Vdata corresponding to a data value (or a grayscale data) included in frame data (or image data). For example, the digital-to-analog converter DAC may select one of gamma voltages based on the data value and output the selected gamma voltage as the data voltage Vdata. The data driver 300 may further include an output buffer, and may provide the data voltage Vdata to the m-th data line DLm through the output buffer.

The compensator 500 may further include a sensing unit SU and an analog-to-digital converter (ADC) connected to the m-th sensing line RLm.

The sensing unit SU may include an initialization switch SW_VINT, a sensing capacitor CSEN, a sampling switch SW_SPL, a first capacitor C1, a share switch SW_SHARE, a reset switch SW_RST, a second capacitor C2, and an output switch SW_CH.

The initialization switch SW_VINT may be connected between a power line to which the initialization voltage VINT is applied and the m-th sensing line RLm. Here, the initialization voltage VINT may have a voltage level lower than a voltage capable of operating the light emitting element LD. When the initialization switch SW_VINT is turned on, the initialization voltage VINT may be applied to the m-th sensing line RLm, and when the third transistor T3 of the pixel PX is turned on, the initialization voltage VINT may be applied to the second node N2 of the pixel PX. Since the initialization voltage VINT has the voltage level lower than the voltage capable of operating the light emitting element LD, the light emitting element LD may not emit light even though the first transistor T1 is turned on.

The sensing capacitor CSEN may be connected between the m-th sensing line RLm and reference power. Here, the reference power may have a ground voltage, but is not limited thereto. When the initialization switch SW_VINT is turned off and the third transistor T3 of the pixel PX is turned on, the sensing capacitor CSEN may be charged by a sensing current provided through the second node N2. That is, characteristic information of the pixel PX provided through the second node N2 may be stored in the sensing capacitor CSEN.

The sampling switch SW_SPL may be connected between the m-th sensing line RLm and a third node N3. The first capacitor C1 may be connected between the third node N3 and the reference power. While the sampling switch SW_SPL is turned on, the first capacitor C1 may sample the characteristic information of the pixel PX (or the first transistor T1) stored in the sensing capacitor CSEN. That is, the compensator 500 may sample a sensing signal through the sampling switch SW_SPL and the first capacitor C1.

The share switch SW_SHARE may be connected between the third node N3 and a fourth node N4, the reset switch SW_RST may be connected between the fourth node N4 and the reference power, and the second capacitor C2 may be connected between the fourth node N4 and the reference power. When the share switch SW_SHARE is turned on and the first capacitor C1 and the second capacitor C2 share a charge, a node voltage of the fourth node N4 (and a node voltage of the third node N3)) may be changed. According to an operation of the share switch SW_SHARE and the reset switch SW_RST, the share switch SW_SHARE, the reset switch SW_RST, and the second capacitor C2 may function as a buffer. Here, a gain of the buffer may be changed according to a capacitance ratio of the first capacitor C1 and the second capacitor C2, and may be N (where N is an integer greater than 1). That is, the share switch SW_SHARE, the reset switch SW_RST, and the second capacitor C2 may amplify the node voltage of the third node N3.

The output switch SW_CH may be connected between the fourth node N4 and the analog-to-digital converter ADC, and may connect the fourth node N4 to an input terminal of the analog-to-digital converter ADC. In this case, the node voltage of the fourth node N4 may be applied to the analog-to-digital converter ADC.

A capacitor connected between the input terminal of the analog-to-digital converter ADC and the reference power to maintain the node voltage of the fourth node N4 provided to the analog-to-digital converter ADC, and an initialization circuit (for example, capacitor initialization power and a switch connecting the capacitor initialization power to the input of the analog-to-digital converter ADC) for initializing the input terminal of the analog-to-digital converter ADC (or the capacitor) may be further included.

The analog-to-digital converter ADC may convert a voltage provided to the input terminal into a data value (for example, a digital code). That is, the data driver 300 may convert the sampled sensing signal from an analog form to a digital form through the analog-to-digital converter ADC. The sensing signal of the digital form (for example, sensing data) may be provided to the timing controller 400.

In FIG. 4, the sensing unit SU includes the capacitors CSEN, C1, and C2 and the switches SW_VINT, SW_SPL, SW_SHARE, SW_RST, and SW_CH, but this is an example, and the embodiment described herein is not limited thereto. For example, when the sensing unit SU may detect the voltage (or a current corresponding thereto) of the second node N2 of the pixel PX, various circuits (for example, a sensing circuit that converts a sensing current into a sensing voltage using an amplifier, and samples and holds the converted sensing voltage) may be implemented as the sensing unit SU.

Hereinafter, an operation of the display device of FIG. 1 and the pixel of FIG. 3 is described with reference to FIGS. 5 and 6.

Figure 5:
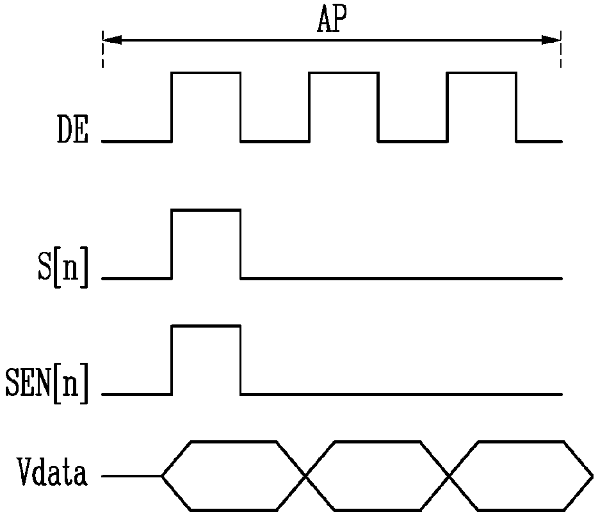
FIG. 5 is a timing diagram illustrating an operation of the pixel shown in FIG. 3 in an active period.

FIG. 5 is a timing diagram illustrating the operation of the pixel shown in FIG. 3 in the active period. FIG. 6 is a timing diagram illustrating the operation of the pixel of FIG. 3 in the blank period. Hereinafter, the operation of the pixel PX is described with reference to FIGS. 3 and 4 together.

Figure 6:
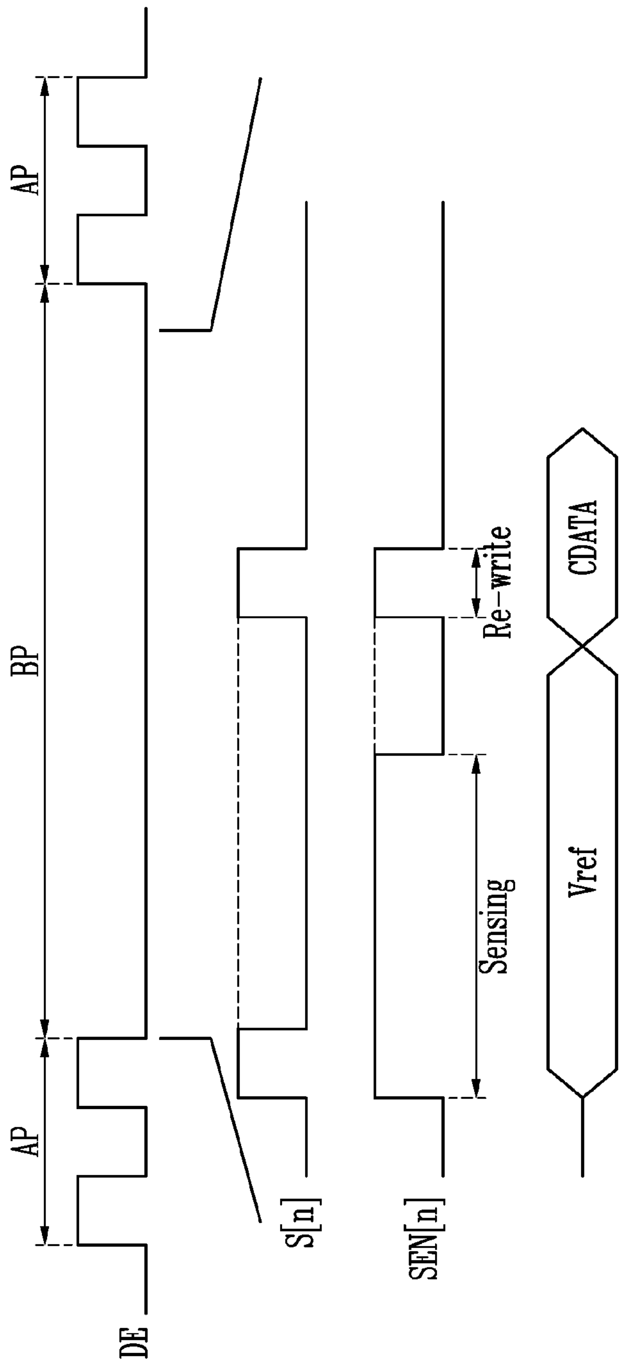
FIG. 6 is a timing diagram illustrating an operation of the pixel of FIG. 3 in a blank period.

Referring to FIGS. 5 and 6, driving for each pixel PX may include an active period AP and a blank period BP between adjacent active periods AP.

In FIGS. 5 and 6, the data enable signal DE may define the active period AP (or an effective data period) in which image data is applied, and a period in which the data enable signal DE is not applied may be the blank period BP.

In the active period AP, the scan signal S[n] may be supplied to the second transistor T2 through the n-th scan line SLn, and the sensing control signal SEN[n] may be supplied to the third transistor T3 through the n-th sensing control line SSLn. Accordingly, the second transistor T2 may be turned on, and the data voltage Vdata may be transmitted to the first node N1. In addition, the third transistor T3 ma be turned on, and the initialization voltage VINT may be transmitted to the second node N2.

A voltage of a difference between the data voltage Vdata and the initialization voltage VINT may be stored in the storage capacitor Cst. Accordingly, the first transistor T1 may apply a current corresponding to the voltage stored in the storage capacitor Cst to the light emitting element LD. Therefore, the light emitting element LD may generate light with a predetermined luminance.

In the blank period BP, driving for at least one pixel PX may include a sensing period Sensing and a data re-write period Re-write.

That is, the display device 1000 (refer to FIG. 1) may select at least one pixel PX (or the pixels PX disposed in one pixel row) for each blank period BP to obtain a characteristic of the pixel PX, and may apply a re-write data voltage (for example, compensation image data CDATA of FIG. 8) for recovering to a previous image display state after sensing.

In the sensing period Sensing, the second transistor T2 may be turned on, and thus a reference voltage Vref may be supplied to the first node N1. The third transistor T3 may be turned on, and thus the initialization voltage VINT may be supplied to the second node N2 during a predetermined period. After the predetermined period elapses, as the initialization switch SW_VINT of the sensing unit SU (refer to FIG. 4) is turned off, the second node N2 may be floated. The compensator 500 (refer to FIG. 4) may sense a characteristic (for example, a current due to a gate-source voltage difference of the driving transistor) of the first transistor T1 (or the driving transistor) from the second node N2.

Thereafter, in the data re-write period Re-write, in order to restore to an image display state before sensing, the second transistor T2 may be turned on to supply a re-write data voltage to the first node N1, and the third transistor T3 may be turned on to supply the initialization voltage VINT to the second node N2.

Figure 7A:
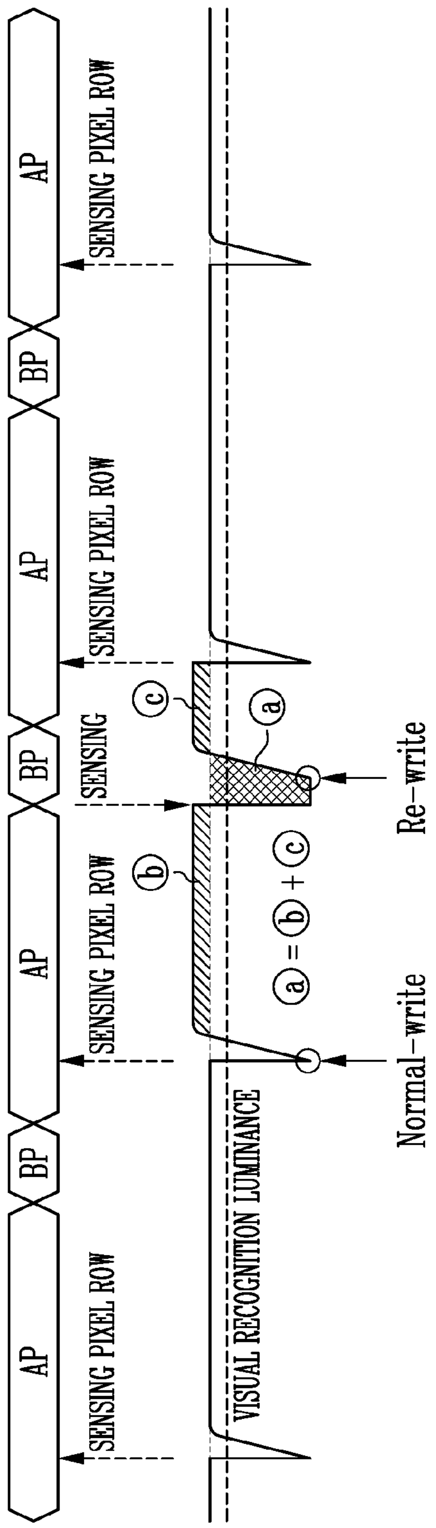
FIG. 7A is a diagram illustrating a method of compensating for a luminance decrease phenomenon of a pixel row sensed in a sensing period of FIG. 6 when a frame rate is fixed.
Figure 7B:
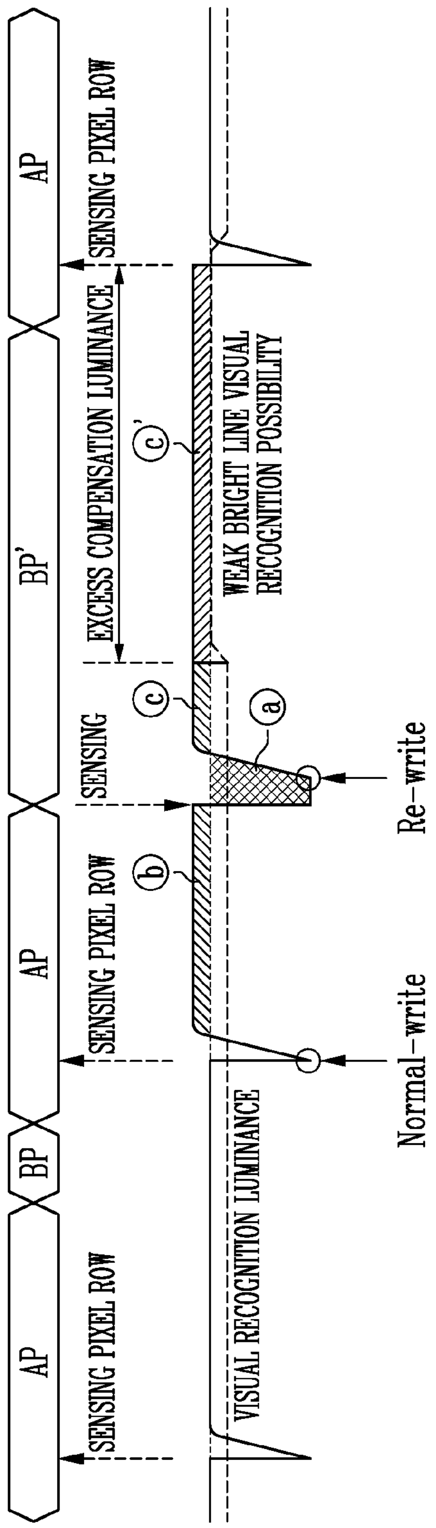
FIG. 7B is a diagram illustrating a problem of the compensation method shown in FIG. 7A when the frame rate is changed.

FIG. 7A is a diagram illustrating a method of compensating for a luminance decrease phenomenon of a pixel row sensed in the sensing period of FIG. 6 when the frame rate is fixed. FIG. 7B is a diagram illustrating a problem of the compensation method shown in FIG. 7A when the frame rate is changed.

Referring to FIGS. 1, 5, 6 and 7A, differently from the active period AP, in the sensing period Sensing within the blank period BP, the data voltage Vdata may not be output to the pixel unit 200. That is, during the sensing period Sensing, the light emitting element LD may be in a non-emission state. Accordingly, a phenomenon in which a pixel row on which sensing is performed is visible to user's eyes may occur.

In order to prevent a decrease of a luminance of the pixel row on which the sensing is performed, as shown in FIG. 7A, in a normal data write period Normal-write before the sensing is performed and the data re-write period Re-write after the sensing is performed, a compensation data voltage obtained by adding an additional data voltage to an original data voltage may be supplied to data lines DL. Accordingly, the phenomenon in which the pixel row on which the sensing is performed is visible to the user's eyes may be reduced. At this time, the additional data voltage may correspond to a compensation value (or a final compensation value) described below.

An embodiment shown in FIG. 7A is a case where the frame rate is constant, even though the compensation data voltage is applied comprehensively for each frame, a luminance amount ⓑ+ⓒ increased by the compensation data voltage and a luminance amount ⓐ decreased during the sensing period Sensing may be maintained substantially identically. At this time, a period from a timing at which the compensation data voltage is output to the data lines DL before the sensing is performed to a timing at which the image is output by the compensation data voltage after the sensing is performed may correspond to one frame period.

On the other hand, since an embodiment shown in FIG. 7B is a case where the frame rate is variable, a length of a blank period BP' may also be changed correspondingly. Therefore, when the compensation data voltage is comprehensively applied for each frame, it may be difficult to maintain the luminance amount ⓑ+ⓒ increased by the compensation data voltage and the luminance amount ⓐ decreased during the sensing period Sensing substantially identically. An embodiment shown in FIG. 7B may correspond to a case where the frame rate of a second frame becomes smaller than a frame rate of a first frame, and thus the blank period BP' of the second frame may become longer than the blank period BP of the first frame. In other words, as a maintenance period of the compensation data voltage applied in the data re-write period Re-write increases by an increased period of the blank period BP', a luminance amount ⓒ' increased by the compensation data voltage may exceed the luminance amount ⓐ decreased during the sensing period Sensing. As a result, by excessively compensating for a decreased luminance, a problem that visual recognition as a weak bright line to the user's eyes rather may occur.

Hereinafter, a method of preventing a phenomenon in which the pixel row on which the sensing is performed is visible to the user's eyes even though the frame rate is variable is described below.

Figure 8:
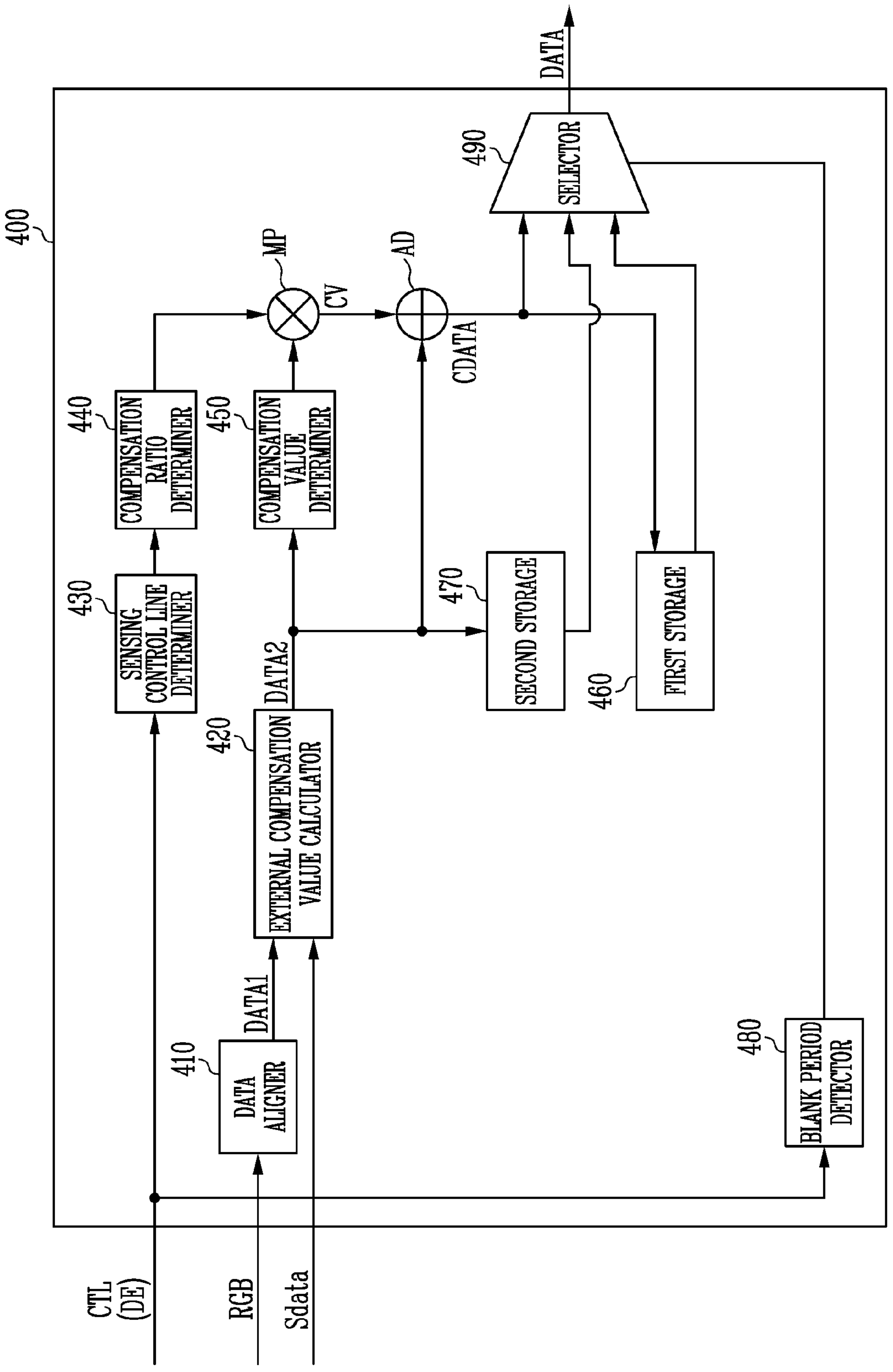
FIG. 8 is a block diagram of a timing controller according to an embodiment.
Figure 9:
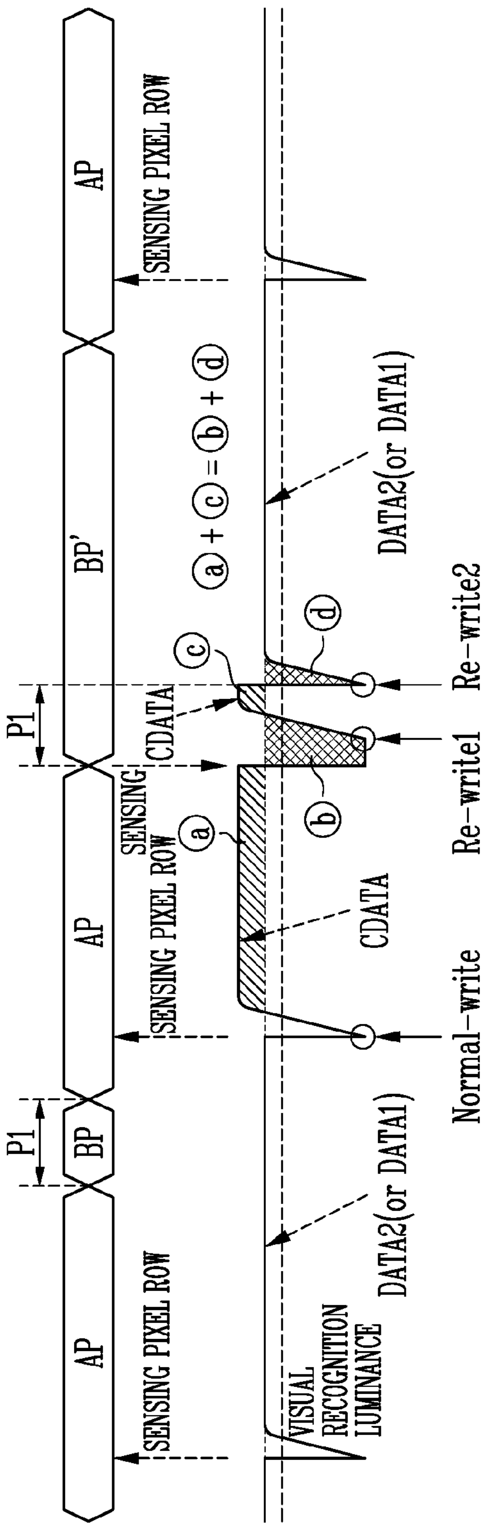
FIG. 9 is a diagram illustrating a luminance change of a pixel row on which sensing is performed in the embodiment of FIG. 8.

FIG. 8 is a block diagram of a timing controller according to an embodiment. FIG. 9 is a diagram illustrating a luminance change of a pixel row on which sensing is performed in the embodiment of FIG. 8. Hereinafter, a configuration of the timing controller is described with reference to FIGS. 1 to 6 together.

Referring to FIG. 8, the timing controller 400 may include a data aligner 410, an external compensation value calculator 420, a sensing control line determiner 430, a compensation ratio determiner 440, a compensation value determiner 450, a first storage 460, a second storage 470, a blank period detector 480, a selector 490, a multiplier MIP, and an adder AD.

The data aligner 410 may convert the image signal RGB supplied from the outside into first image data DATA1 by rearranging the image signal RGB so that the image signal RGB matches a structure of the pixels PX, and may supply the first image data DATA1 to the external compensation value calculator 420.

The external compensation value calculator 420 may generate an external compensation value for compensating for deterioration of the pixels PX by determining a characteristic change of each pixel PX using sensing data Sdata supplied from the compensator 500 (refer to FIG. 1). For example, the external compensation value calculator 420 may detect and compensate for a threshold voltage change, a mobility change of the driving transistor T1 (refer to FIG. 3) included in the pixel PX, a characteristic change of the light emitting element LD (refer to FIG. 3), and the like. The external compensation value calculator 420 may calculate external compensation image data DATA2 by correcting the first image data DATA1 supplied from the data aligner 410 using the external compensation value.

The sensing control line determiner 430 may determine at least one sensing control line SSL (refer to FIG. 1) for performing sensing in the blank period BP. In an embodiment, the sensing control line SSL may be one sensing control line SSL among a plurality of sensing control lines SSL shown in FIG. 1. The sensing control line SSL may be predetermined through a lookup table. Accordingly, pixels PX of one pixel row disposed in parallel along a row direction of the pixel unit 200 (refer to FIG. 1) and connected to one sensing control line SSL may be selected for the sensing. The embodiment described herein is not limited thereto, and the sensing control line determiner 430 may select a plurality of sensing control lines SSL to perform the sensing.

The sensing control line determiner 430 may receive the data enable signal DE and operate in the sensing period Sensing of the blank period BP according to whether the data enable signal DE is applied. For example, when the data enable signal DE is not applied during a predetermined time, the sensing control line determiner 430 may determine the sensing control line SSL for performing the sensing.

The compensation ratio determiner 440 may receive position information of the pixel row on which the sensing is performed from the sensing control line determiner 430. The compensation ratio determiner 440 may determine a compensation ratio according to a position of the pixel row on which the sensing is performed. The compensation ratio according to the position of the pixel row on which the sensing is performed may be previously stored in the lookup table. According to an embodiment, with respect to the pixel PX connected to the sensing control line SSL positioned at a lower end of the pixel unit 200, a low grayscale value may be reflected in the pixels PX positioned at the lower end so that the luminance is lower than that of the pixel PX connected to the sensing control line SSL positioned at an upper end.

The compensation value determiner 450 may receive the external compensation image data DATA2 from the external compensation value calculator 420. At this time, when external compensation is not requested for the first image data DATA1, the compensation value determiner 450 may receive the first image data DATA1 from the external compensation value calculator 420.

The compensation value determiner 450 may determine the compensation value according to a grayscale and/or a color of the external compensation image data DATA2 (or the first image data DATA1). A correction value according to the grayscale and/or the color of the external compensation image data DATA2 (or the first image data DATA1) may be previously stored in the lookup table. For example, when the grayscale increases or decreases based on a specific grayscale of the external compensation image data DATA2 (or the first image data DATA1), the compensation value may increase. In addition, when the color of the external compensation image data DATA2 (or the first image data DATA1) includes red, green, and blue, a compensation value corresponding to the same grayscale may be different for each color.

At this time, the compensation value may correspond to an additional data voltage added to the data voltage supplied before and after the sensing period in order to prevent the luminance of the pixel row on which the sensing is performed from being decreased.

The multiplier MP may calculate a final compensation value CV by multiplying the compensation value provided from the compensation value determiner 450 by the compensation ratio provided from the compensation ratio determiner 440.

The adder AD may calculate compensation image data CDATA by adding the external compensation image data DATA2 (or the first image data DATA1) provided from the external compensation value calculator 420 and the final compensation value CV provided from the multiplier MP.

The first storage 460 may receive the compensation image data CDATA from the adder AD and store the compensation image data CDATA. The first storage 460 may supply the compensation image data CDATA to the selector 490.

The second storage 470 may receive the external compensation image data DATA2 (or the first image data DATA1) from the external compensation value calculator 420 and store the external compensation image data DATA2 (or the first image data DATA1). The second storage 470 may supply the external compensation image data DATA2 (or the first image data DATA1) to the selector 490.

The blank period detector 480 may receive the data enable signal DE and detect the blank period BP according to whether the data enable signal DE is applied. According to an embodiment, the blank period detector 480 may determine that the sensing period Sensing (refer to FIG. 6) is started when the data enable signal DE is not applied during a predetermined time. For example, the blank period detector 480 may determine that the sensing period Sensing is started immediately when the data enable signal DE is not applied.

The selector 490 may receive time point information of the blank period BP (or the sensing period Sensing) from the blank period detector 480. The selector 490 may output the compensation image data CDATA provided from the adder AD at a time point before the sensing period Sensing (or in the normal data write period Normal-write), output the compensation image data CDATA provided from the first storage 460 at a time point after the sensing period Sensing (or in a first data re-write period Re-write1), and output the external compensation image data DATA2 (or the first image data DATA1) provided from the second storage 470 in a second data re-write period Re-write2.

According to an embodiment, a start time of the second data re-write period Re-write2 may be determined by a reference frame frequency. For example, a time point of the second data re-write period Re-write2 may coincide with a time point at which a length P1 of the blank period BP corresponding to the reference frame frequency elapses from a start time point of the sensing period. At this time, the reference frame frequency may be arbitrarily determined. For example, the reference frame frequency may be set as a maximum frame frequency in a variable frequency range.

Referring to FIGS. 1, 8, and 9, the sensing control line determiner 430 may select at least one pixel row for performing the sensing in the blank period BP. The adder AD may calculate the compensation image data CDATA by adding the external compensation image data DATA2 supplied from the external compensation value calculator 420 and the final compensation value CV supplied from the multiplier MP.

The selector 490 may output the compensation image data CDATA received from the adder AD in the normal data write period Normal-write before the sensing is performed. The data driver 300 receiving the compensation image data CDATA may convert the compensation image data CDATA into a compensation data voltage and output the compensation data voltage to the data line DL.

Thereafter, the selector 490 may output the compensation image data CDATA received from the first storage 460 in the first data re-write period Re-write1 after the sensing is performed. The data driver 300 receiving the compensation image data CDATA may convert the compensation image data CDATA into the compensation data voltage and output the compensation data voltage to the data line DL.

Thereafter, the selector 490 may output the external compensation image data DATA2 received from the second storage 470 in the second data re-write period Re-write2 after the sensing is performed. The data driver 300 receiving the external compensation image data DATA2 may convert the external compensation image data DATA2 into the external compensation data voltage and output the external compensation data voltage to the data line DL. However, when external compensation is not requested, the selector 490 may output the first image data DATA1 instead of the external compensation image data DATA2, and in this case, the data driver 300 may convert the first image data DATA1 into a first data voltage and output the first data voltage to the data line DL.

At this time, a luminance amount ⓐ+ⓒ increased by the compensation data voltage and a luminance amount ⓑ+ⓓ decreased during the sensing period Sensing (including the first data re-write period Re-write1) and the second data re-write period Re-write2 may be substantially the same.

As described above, by outputting the same voltage as the external compensation data voltage applied to the active period AP in the second data re-write period Re-write2 of the blank period BP', a decreased luminance may be accurately compensated without erroneous compensation regardless of a change of the frame rate.

Hereinafter, other embodiments are described. In the following embodiment, a description of the same configuration as that of the previously described embodiment is omitted or simplified for ease in explanation of these other embodiments, and differences are mainly described.

Figure 10:
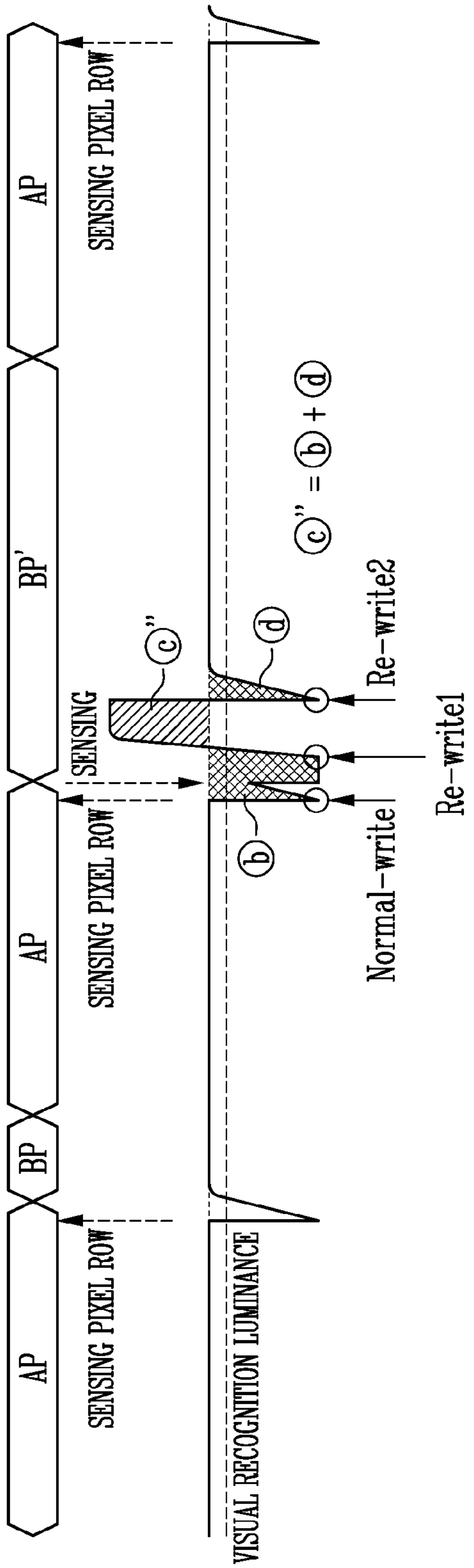
FIG. 10 is a diagram illustrating a luminance change of a case where sensing is performed on a pixel row disposed at a lower end of a pixel unit.

FIG. 10 is a diagram illustrating a luminance change of a case where the sensing is performed on the pixel row disposed at the lower end of the pixel unit.

Referring to FIGS. 1 and 8 to 10, an embodiment shown in FIG. 10 is different from the embodiment of FIG. 9 in which the pixel row on which the sensing is performed is disposed at the upper end of the pixel unit 200, in that the pixel row on which the sensing is performed is disposed at the lower end of the pixel unit 200.

Specifically, as shown in FIG. 10, when the pixel row on which the sensing is performed is disposed at the lower end of the pixel unit 200, a compensation time is insufficient, and thus a luminance amount increase by the compensation data voltage output in the normal data write period Normal-write is not able to be expected. In other words, in a case of FIG. 10, luminance amount ⓐ compensation by the compensation data voltage output in the normal data write period Normal-write of FIG. 9 is not able to be expected.

Therefore, a size of the compensation image data CDATA output in the first data re-write period Re-write1 after the sensing is performed may vary in response to the position of the pixel row on which the sensing is performed. According to an embodiment, the compensation ratio determiner 440 may change the size of the compensation image data CDATA output in the first data re-write period Re-write1 based on the position information of the pixel row on which the sensing is performed provided from the sensing control line determiner 430. For example, the size of the compensation image data CDATA output in the first data re-write period Re-write1 after the sensing is performed may increase as the position of the pixel row on which the sensing is performed is closer to the lower end of the pixel unit 200. At this time, a luminance amount ⓒ"" increased by the compensation data voltage of the first data re-write period Re-write1 after the sensing is performed and the luminance amount ⓑ+ⓓ decreased during the sensing period Sensing (including the first data re-write period Re-write1) and the second data re-write period Re-write2 may be substantially the same.

Figure 11:
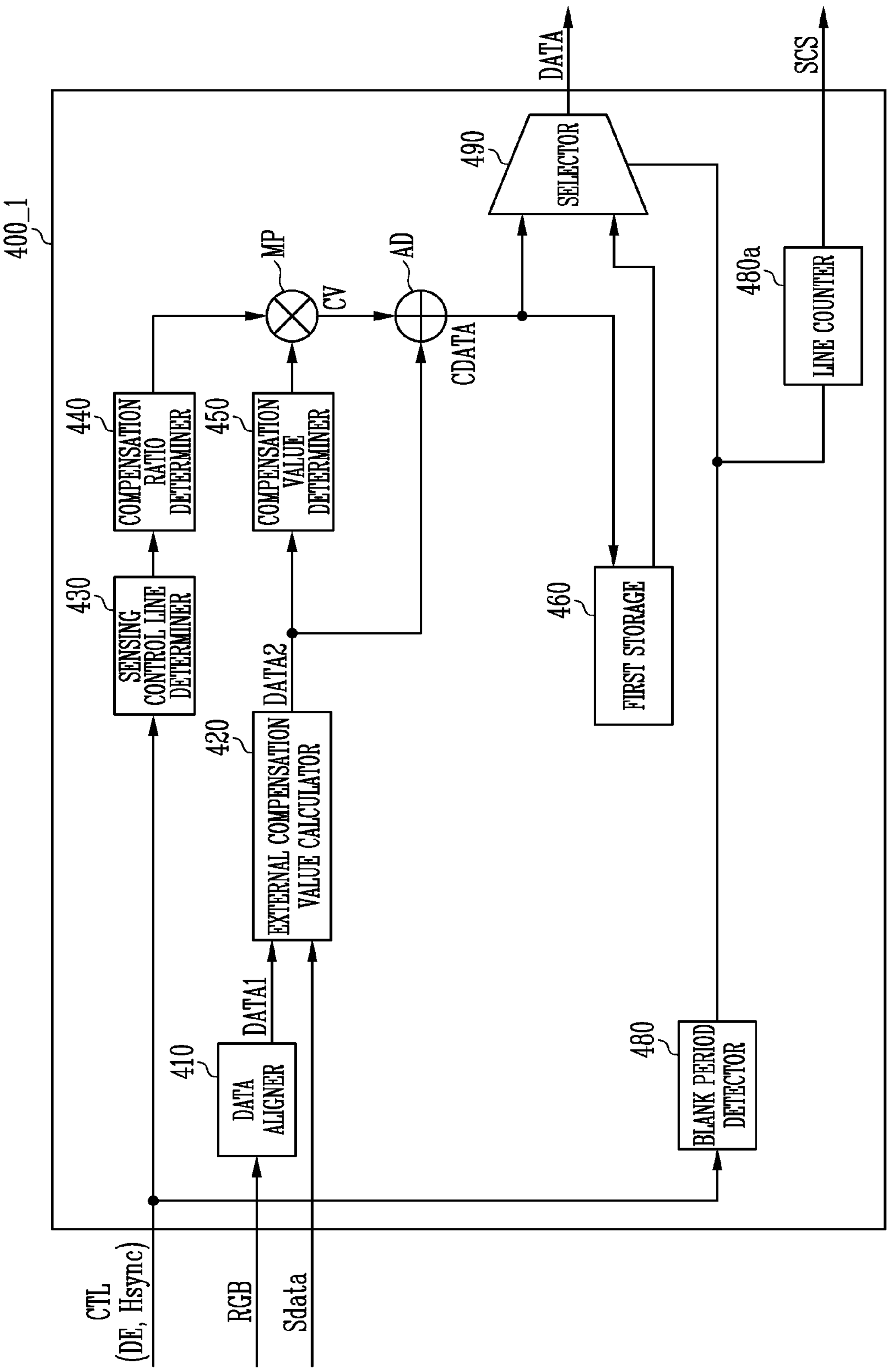
FIG. 11 is a block diagram of a timing controller according to another embodiment.
Figure 12:
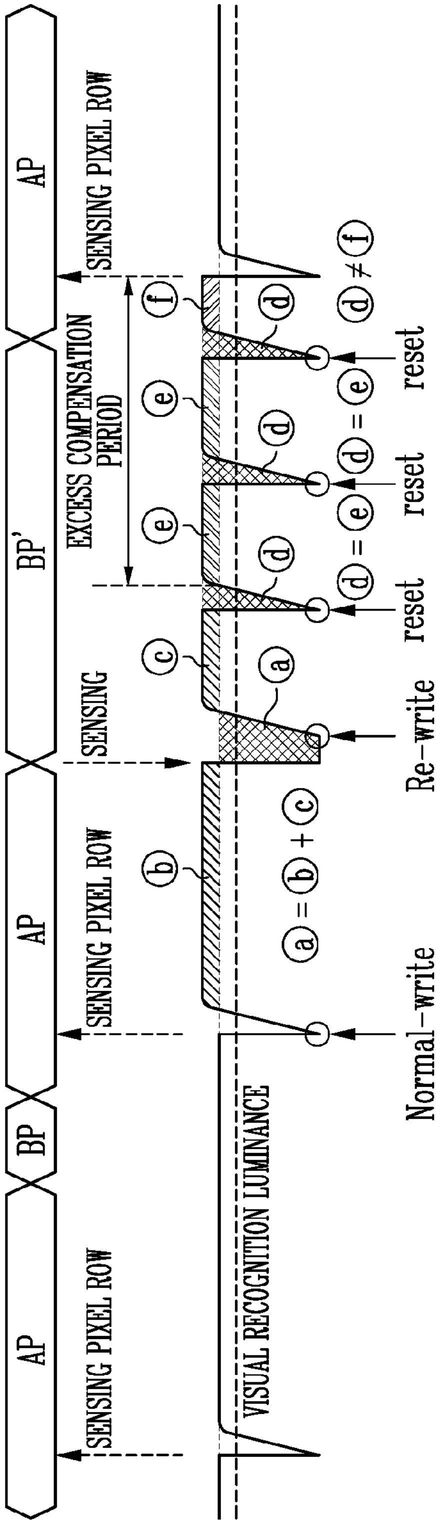
FIG. 12 is a diagram illustrating a luminance change of a pixel row on which the sensing is performed in the embodiment of FIG. 11.

FIG. 11 is a block diagram of a timing controller according to another embodiment. FIG. 12 is a diagram illustrating a luminance change of a pixel row on which the sensing is performed in the embodiment of FIG. 11. Hereinafter, a configuration of the timing controller is described with reference to FIGS. 1 to 6 together.

Referring to FIGS. 8 and 11, the timing controller 400_1 shown in FIG. 11 is different from the timing controller 400 shown in FIG. 8, in that the second storage 470 is omitted and a line counter 480*a* is added. Since configurations 410, 420, 430, 440, 450, MP, and AD for generating the compensation image data CDATA of FIG. 11 are the same as the configurations 410, 420, 430, 440, 450, MIP, and AD of FIG. 8, a repetitive description is omitted, and hereinafter, the embodiment described herein is described based on the line counter 480*a*, which is a difference.

Specifically, referring to FIGS. 11 and 12, the blank period detector 480 may receive the data enable signal DE from the outside, and detect the blank period BP according to whether the data enable signal DE is applied. According to an embodiment, the blank period detector 480 may determine that the sensing period Sensing (refer to FIG. 6) is started when the data enable signal DE is not applied during a predetermined time. For example, the blank period detector 480 may determine that the sensing period is started immediately when the data enable signal DE is not applied.

In addition, the blank period detector 480 may receive the horizontal synchronization signal Hsync from the outside and provide the horizontal synchronization signal Hsync to the line counter 480*a*.

The line counter 480*a* may calculate the frame frequency (or the frame rate) by counting the horizontal synchronization signal Hsync supplied from the blank period detector 480.

According to an embodiment, the line counter 480*a* may output the scan driving control signal SCS for controlling the scan signal S[n] and/or the sensing control signal SEN[n] based on the calculated frame frequency. For example, when a frequency of the current frame is less than a reference frequency, the line counter 480*a* may generate the scan driving control signal SCS for providing the sensing control signal SEN[n] to the third transistor T3 (refer to FIG. 3) in a preset period during the blank period BP' of the current frame that becomes longer than the length of the blank period BP of the previous frame. At this time, the reference frequency may be an arbitrarily set frame frequency, and may be, for example, a maximum frame frequency that may be implemented by the display device 1000 (refer to FIG. 1). In addition, when the sensing control signal SEN[n] is provided to the third transistor T3 (refer to FIG. 3) in the preset period, the scan driving control signal SCS for providing the scan signal S[n] to the second transistor T2 (refer to FIG. 3) together may be output.

Referring to FIGS. 1, 11, and 12, the sensing control line determiner 430 may select at least one pixel row for performing sensing in the blank period BP. The adder AD may calculate the compensation image data CDATA by adding the external compensation image data DATA2 supplied from the external compensation value calculator 420 and the final compensation value CV supplied from the multiplier MP.

The selector 490 may output the compensation image data CDATA received from the adder AD in the normal data write period Normal-write before the sensing is performed. The data driver 300 receiving the compensation image data CDATA may convert the compensation image data CDATA into the compensation data voltage and output the compensation data voltage to the data line DL.

Thereafter, the selector 490 may output the compensation image data CDATA received from the first storage 460 in the data re-write period Re-write after the sensing is performed. The data driver 300 receiving the compensation image data CDATA may convert the compensation image data CDATA into the compensation data voltage and output the compensation data voltage to the data line DL.

When the current frame frequency becomes less than the previous frame frequency, an excess compensation period may be generated in response to the increased length of the blank period BP' of the current frame compared to the length of the blank period BP of the previous frame. A problem in that the luminance is rather increased due to the compensation data voltage for preventing the luminance decrease of the pixel row sensed in the sensing period Sensing may occur. In order to prevent this, the pixels PX included in the pixel row on which the sensing is performed may be reset to the initialization voltage VINT in a preset period during the excess compensation period.

Specifically, the line counter 480*a* may count the horizontal synchronization signal Hsync supplied from the blank period detector 480 to calculate the frame frequency (or the frame rate), and output the scan driving control signal SCS for controlling the scan signal S[n] and/or the sensing control signal SEN[n], based on the calculated frame frequency.

According to an embodiment, the scan driver 100 may provide the scan signal S[n] and/or the sensing control signal SEN[n] to the pixel PX for each reset period reset having a preset period during the excess compensation period.

For example, the scan driver 100 may provide the sensing control signal SEN[n] to the third transistor T3 in the preset period during the excess compensation period based on the scan driving control signal SCS. Referring to FIG. 4, when the sensing control signal SEN[n] is provided and thus the third transistor T3 is turned on, the initialization voltage VINT may be applied to the second node N2 of the pixel PX. Since the initialization voltage VINT has a voltage level lower than a voltage capable of operating the light emitting element LD, the light emitting element LD may not emit light even though the first transistor T1 is turned on. In addition, during the reset period reset, the scan driver 100 may supply the scan signal S[n] to the second transistor T2 and supply the sensing control signal SEN[n] to the third transistor T3. Accordingly, the second transistor T2 may be turned on, and thus the compensation data voltage may be transmitted to the first node N1. In addition, the third transistor T3 may be turned on, and thus the initialization voltage VINT may be transmitted to the second node N2. Also in this case, since the initialization voltage VINT is applied to the second node N2, the light emitting element LD may not emit light.

At this time, the luminance amount ⓑ+ⓒ increased by the compensation data voltage and the luminance amount ⓐ decreased during the sensing period Sensing (including the first data re-write period Re-write1) may be substantially the same.

In addition, a luminance amount ⓓ decreased in each reset period reset may be substantially the same as a luminance amount ⓔ of the excess compensation period between the reset period reset and an adjacent reset period reset. However, the luminance amount ⓓ decreased in reset period reset performed at a boundary between the blank period BP' and the successive active period AP may be different from a luminance amount Cf of the excess compensation period between the reset period reset and the adjacent normal data write period Normal-write. Therefore, it may be preferable to set a period of the reset period reset to be not longer than one horizontal period.

As described above, by initializing the pixel PX in the preset period during the excess compensation period, the decreased luminance may be easily compensated without erroneous compensation regardless of the change of the frame rate.

Figure 13:
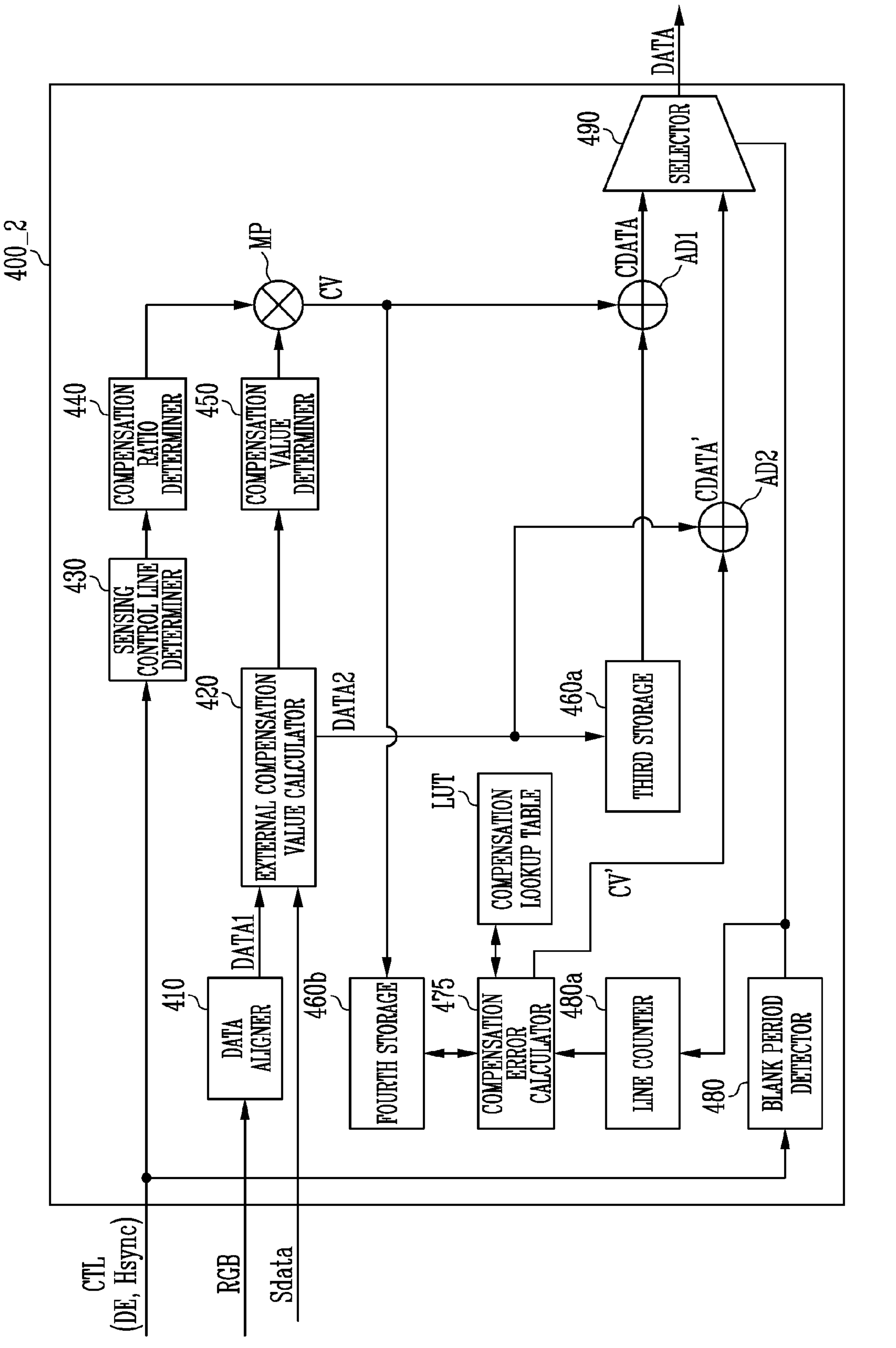
FIG. 13 is a block diagram of a timing controller according to still another embodiment.
Figure 14:
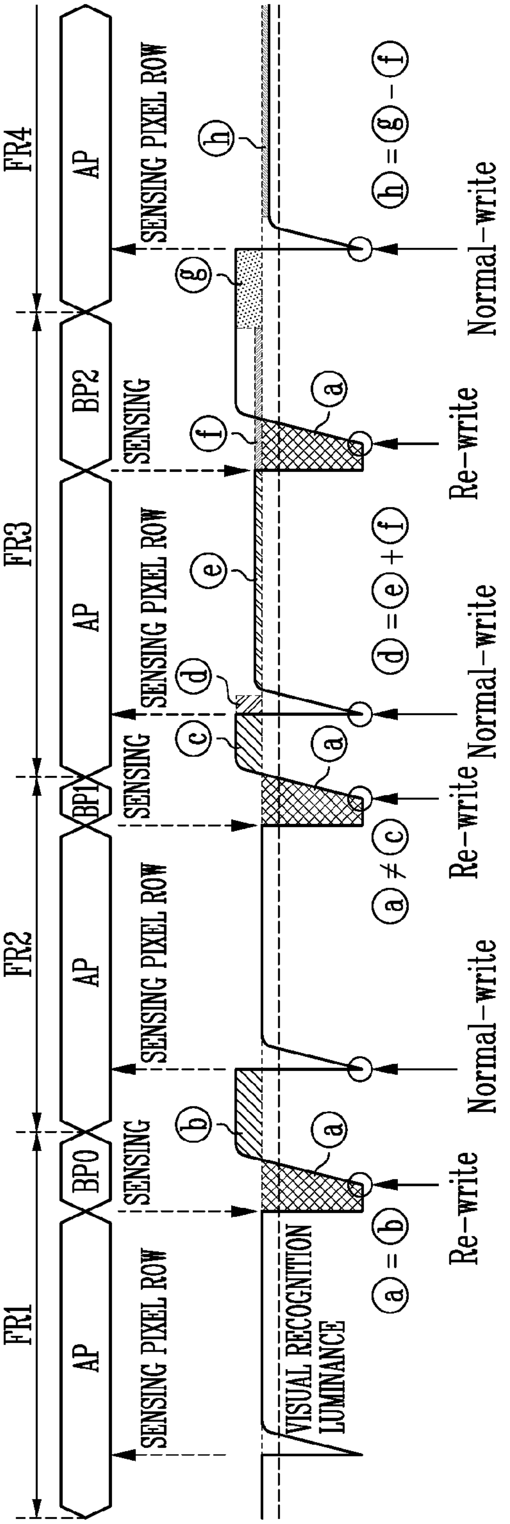
FIG. 14 is a diagram illustrating a luminance change of the pixel row on which the sensing is performed in the embodiment of FIG. 13.

FIG. 13 is a block diagram of a timing controller according to still another embodiment. FIG. 14 is a diagram illustrating a luminance change of the pixel row on which the sensing is performed in the embodiment of FIG. 13. Hereinafter, a configuration of the timing controller is described with reference to FIGS. 1 to 6 together.

Referring to FIGS. 8 and 13, the timing controller 400_2 shown in FIG. 13 is different from the timing controller 400 shown in FIG. 8, in that the timing controller 400_2 includes a third storage **460*a*, a fourth storage 460*b*, a compensation error calculator 475, a compensation lookup table LUT, and the line counter 480*a*. Since configurations 410, 420, 430, 440, 450, and MP for generating the compensation image data CDATA of FIG. 13 are substantially the same as the configurations 410, 420, 430, 440, 450, and MP of FIG. 8**, a repetitive description is omitted, and hereinafter, differences are mainly described.

Specifically, referring to FIGS. 8 and 13, the third storage **460*a* may receive the external compensation image data DATA2 from the external compensation value calculator 420 and store the external compensation image data DATA2. The third storage 460*a* may provide the external compensation image data DATA2 to a first adder AD1. A second adder AD2 may directly receive the external compensation image data DATA2 from the external compensation value calculator 420**.

The fourth storage **460*b* may receive the final compensation value CV from the multiplier MP and store the final compensation value CV. The fourth storage 460*b* may provide the final compensation value CV to the compensation error calculator 475**.

The blank period detector 480 may receive the data enable signal DE from the outside and detect the blank period BP according to whether the data enable signal DE is applied. According to an embodiment, the blank period detector 480 may determine that the sensing period Sensing (refer to FIG. 6) is started when the data enable signal DE is not applied during a predetermined time. For example, the blank period detector 480 may determine that the sensing period is started immediately when the data enable signal DE is not applied.

In addition, the blank period detector 480 may receive the horizontal synchronization signal Hsync from the outside and provide the horizontal synchronization signal Hsync to the line counter **480*a***.

The line counter **480*a* may calculate the frame frequency (or the frame rate) by counting the horizontal synchronization signal Hsync supplied from the blank period detector 480. According to an embodiment, the line counter 480*a*** may count the horizontal synchronization signal Hsync to calculate the frame frequency of the previous frame.

The compensation error calculator 475 may calculate an error value based on the final compensation value CV supplied to the fourth storage **460*b* and frame frequency information of the previous frame supplied from the line counter 480*a*. For example, the compensation error calculator 475 may calculate a variation amount (that is, an increase amount or a decrease amount) of the frame time by comparing the reference frame frequency with the frame frequency of the previous frame. The compensation error calculator 475** may calculate an error value by multiplying the final compensation value CV by the variation amount of the frame time. The reference frame frequency may be an arbitrary frame frequency. However, since visual recognition of a weak bright line due to over-compensation is higher than visual recognition of a weak dark line due to under-compensation, it is preferable to set the reference frequency in consideration of this. For example, when a variable frequency range is 48 Hz to 240 Hz, the reference frequency may be set to 96 Hz.

The compensation lookup table LUT may include compensation values corresponding to error values.

The compensation error calculator 475 may accumulate and store the compensation value corresponding to the error values calculated for each frame in the fourth storage **460*b*. In other words, the compensation value stored in the fourth storage 460*b* may be updated for each frame. However, the compensation error calculator 475** according to an embodiment may delete the accumulated compensation value for each preset number of frames in order to prevent excessive data increase.

The compensation error calculator 475 may provide the accumulated compensation value CV' stored in the fourth storage **460*b*** to the second adder AD2.

The first adder AD1 may calculate the compensation image data CDATA by adding the external compensation image data DATA2 supplied from the third storage **460*a*** and the final compensation value CV supplied from the multiplier MP.

The second adder AD2 may calculate accumulated compensation image data CDATA' by adding the external compensation image data DATA2 supplied from the external compensation value calculator 420 and the accumulated compensation value CV' supplied from the compensation error calculator 475.

The selector 490 may receive time point information of the blank period BP (or the sensing period Sensing) from the blank period detector 480. The selector 490 may output the compensation image data CDATA received from the first adder AD1 to the data driver 300 at a time point after the sensing period Sensing (or in the data re-write period Re-write), and output the accumulated compensation image data CDATA' provided from the second adder AD2 at a time point after the sensing period Sensing (or in the normal data write period Normal-write of the next frame).

Referring to FIGS. 1, 13, and 14, the sensing control line determiner 430 may select at least one pixel row for performing sensing in blank periods BP0, BP1, and BP2. At this time, for convenience of description, in FIG. 14, the sensing is performed successively in the same pixel row, but the embodiment described herein is not limited thereto. For example, the sensing may be sequentially performed for each pixel row.

The selector 490 may output the compensation image data CDATA provided from the first adder AD1 to the data driver 300 in the data re-write period Re-write after the sensing is performed during the blank period BP0 of the first frame FR1. The data driver 300 receiving the compensation image data CDATA may convert the compensation image data CDATA into the compensation data voltage and output the compensation data voltage to the data line DL. Thereafter, the selector 490 may output the accumulated compensation image data CDATA' provided from the second adder AD2 to the data driver 300 in the normal data write period Normal-write of the next frame (for example, a second frame FR2). The data driver 300 receiving the accumulated compensation image data CDATA' may convert the accumulated compensation image data CDATA' into an accumulated compensation data voltage and output the accumulated compensation data voltage to the data line DL.

At this time, since a frame frequency of a first frame FR1 is the same as the reference frame frequency, the blank period BP0 is the same as the blank period of the reference frame frequency, and thus a luminance decrease due to the sensing period may be compensated without error. Therefore, since luminance compensation due to sensing is not requested, the accumulated compensation image data CDATA' may be the same as the external compensation image data DATA2 (or the first image data DATA1). That is, the luminance amount ⓑ increased by the compensation data voltage may be substantially the same as the luminance amount ⓐ decreased in the sensing period.

Next, the selector 490 may output the compensation image data CDATA provided from the first adder AD1 to the data driver 300 in the data re-write period Re-write after the sensing is performed during the blank period BP1 of the second frame FR2. The data driver 300 receiving the compensation image data CDATA may convert the compensation image data CDATA into the compensation data voltage and output the compensation data voltage to the data line DL. Thereafter, the selector 490 may output the accumulated compensation image data CDATA' provided from the second adder AD2 in the normal data write period Normal-write of the next frame (for example, a third frame FR3). The data driver 300 receiving the accumulated compensation image data CDATA' may convert the accumulated compensation image data CDATA' into the accumulated compensation data voltage and output the accumulated compensation data voltage to the data line DL.

At this time, since a frame frequency of the second frame FR2 is greater than the reference frame frequency, the blank period BP1 is decreased compared to the blank period of the reference frame frequency, and thus the luminance decrease due to the sensing period may not be sufficiently compensated. Therefore, a size of the accumulated compensation image data CDATA' may increase to compensate for the luminance amount ⓓ decreased due to a decrease of the blank period BP1. That is, a luminance amount ⓔ+ⓕ increased by the accumulated compensation data voltage may be substantially the same as the luminance amount ⓓ decreased due to the decrease of the blank period BP1. However, in FIG. 14, since it is assumed that the sensing is performed successively on the same pixel row, the luminance decrease may be insufficiently compensated by the luminance amount ⓕ compensated by the accumulated compensation data voltage due to the sensing period.

Next, the selector 490 may output the compensation image data CDATA provided from the first adder AD1 to the data driver 300 in the data re-write period Re-write after the sensing is performed during the blank period BP1 of the third frame FR3. The data driver 300 receiving the compensation image data CDATA may convert the compensation image data CDATA into the compensation data voltage and output the compensation data voltage to the data line DL. Thereafter, the selector 490 may output the accumulated compensation image data CDATA' provided from the second adder AD2 to the data driver 300 in the normal data write period Normal-write of the next frame (for example, a fourth frame FR3). The data driver 300 receiving the accumulated compensation image data CDATA' may convert the accumulated compensation image data CDATA' into the accumulated compensation data voltage and output the accumulated compensation data voltage to the data line DL.

At this time, since the frame frequency of the third frame FR3 is less than the reference frame frequency, the blank period BP1 increases compared to the blank period of the reference frame frequency, and thus the luminance decrease due to the sensing period may be excessively compensated. Therefore, the size of the accumulated compensation image data CDATA' may be decreased to compensate for a luminance amount ⓖ increased by an increase of the blank period BP2. That is, a luminance amount ⓗ decreased by the accumulated compensation data voltage may be substantially the same as a luminance amount ⓖ-ⓕ obtained by subtracting the luminance amount ⓕ insufficiently compensated due to the sensing period in the previous frame (for example, the third frame FR3) from the luminance amount ⓖ increased by the increase of the blank period BP2.

As described above, by compensating for the luminance change due to the sensing period and frequency change occurring in the previous frame by accumulating the luminance change in the current frame, the luminance change may be compensated without erroneous compensation regardless of the change of the frame rate.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:

a pixel unit that includes a plurality of pixels;

a compensator configured to receive sensing data from the pixel unit in a sensing period and that detects and compensates for a characteristic of the pixels; and a timing controller configured to convert an image signal received external to the display device into image data, wherein a frame comprises:

an active period in which the image data is supplied; and a blank period of which a length is changed according to a frame frequency change, and; and wherein the active period and the blank period together include, in sequential order:

a normal data write sub-period in the active period, a sensing sub-period following the normal data write sub-period, a first data re-write sub-period in the blank period following the sensing sub-period, and a second data re-write sub-period in the blank period following the first data re-write sub-period, and the timing controller is configured to:

output compensation image data for compensating for a luminance decrease due to the sensing sub-period in the normal data write sub-period;

output the compensation image data in the first data re-write sub-period, and to;

output the image data in the second data re-write sub-period;

adjust the compensation image data based on a luminance compensation gain determined according to a grayscale and/or a color of the image data; and vary a size of the compensation image data in response to a position of the pixels and changes in the frame frequency.

2. The display device according to claim 1, wherein a start time point of the second data re-write sub-period coincides with a time when a length of a blank period corresponding to a maximum frame frequency elapses from a start time point of the sensing period.

3. The display device according to claim 1, wherein when external compensation is required, the timing controller is configured to:

change the image data to external compensation image data based on the data sensed in the sensing sub-period;

output the external compensation image data instead of the image data in the normal data write sub-period and the second data re-write sub-period; and adjust the external compensation image data based on grayscale, color, and frame frequency changes to ensure consistent luminance correction.

4. The display device according to claim 3, further comprising:

a data driver configured to convert the image data, the external compensation image data, and the compensation image data received from the timing controller into a data voltage, an external compensation data voltage, and a compensation data voltage, respectively, and supply the data voltage, the external compensation data voltage, and the compensation data voltage to the pixel unit wherein the data driver is configured to process dynamically adjusted compensation image data based on grayscale, color, pixel position, and frame frequency changes.

5. The display device according to claim 4, wherein a total luminance amount increased by the compensation data voltage is substantially the same as a luminance amount decreased during the first data re-write sub-period and the second data re-write sub-period.

6. The display device according to claim 4, wherein the timing controller is configured to vary a size of the compensation image data output in the first data re-write sub-period in response to a position of the pixels.

7. The display device according to claim 6, wherein the timing controller is configured to increase the size of the compensation image data as the position of the pixels is closer to a lower end of the pixel unit.

8. The display device according to claim 7, wherein a luminance amount increased by the compensation data voltage output in the first data re-write sub-period is substantially the same as a luminance amount decreased during the first data re-write sub-period and the second data re-write sub-period.

9. The display device according to claim 3, wherein the timing controller is configured to determine a size of the compensation image data based on a grayscale and/or a color of the image data or the external compensation image data.

* * * * *